May 21, 1940.  W. G. HARDING ET AL  2,201,174
AUTOMATIC STEERING SYSTEM FOR AIRCRAFT
Filed July 2, 1938    2 Sheets-Sheet 1

INVENTORS
William G. Harding
Robert H. Nisbet
BY
Herbert H. Thompson
THEIR ATTORNEY.

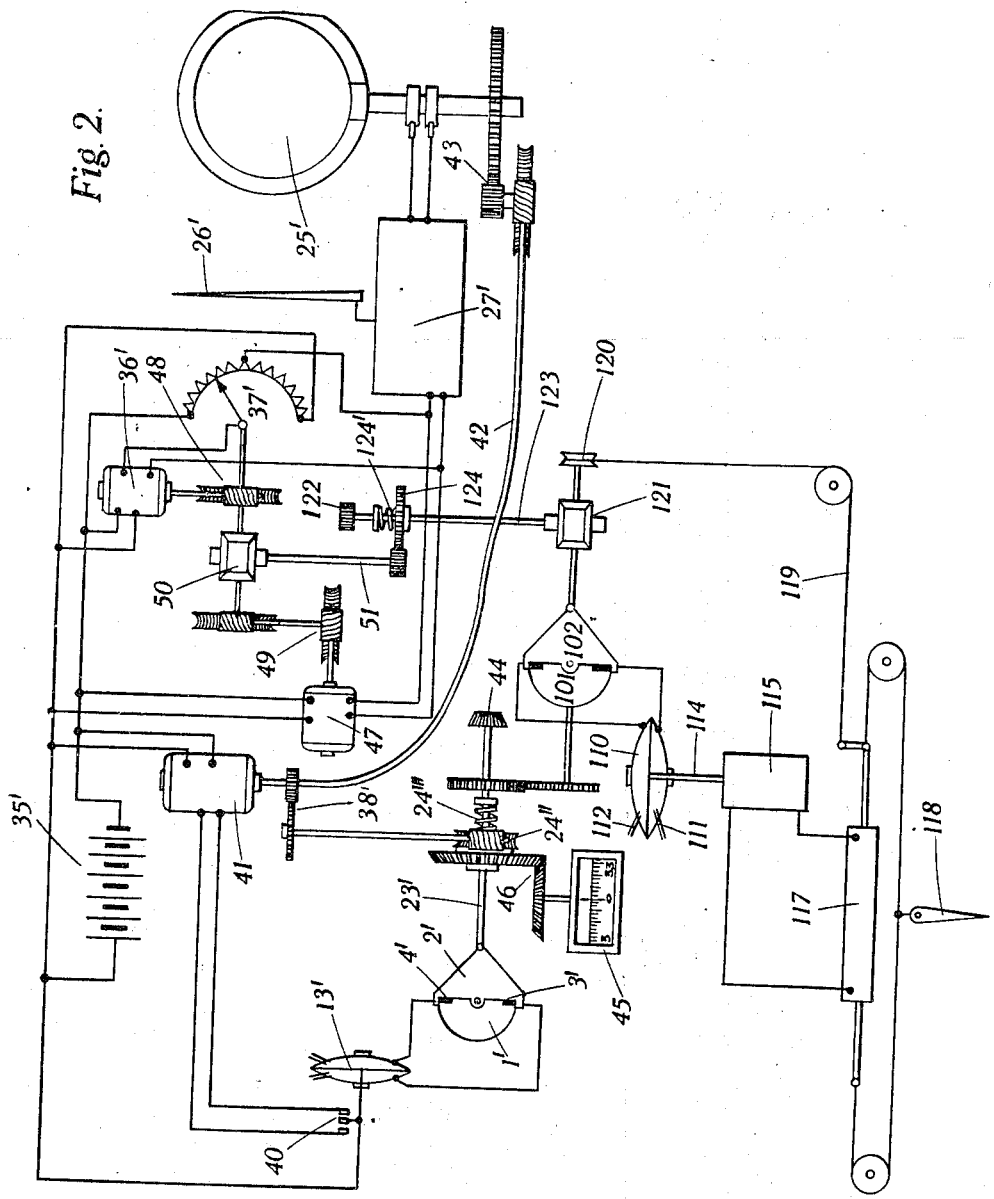

Patented May 21, 1940

2,201,174

UNITED STATES PATENT OFFICE 2,201,174

AUTOMATIC STEERING SYSTEM FOR AIRCRAFT

William George Harding, Whitton, and Robert Hayes Nisbet, Osterley, England, assignors to Sperry Gyroscope Company, Inc., Brooklyn, N. Y., a company of New York Application July 2, 1938, Serial No. 217,320
In Great Britain July 3, 1937

7 Claims. (Cl. 244—77)

This invention relates to automatic steering systems for aircraft and is particularly concerned with the problem of automatic steering to a distant objective, so that the path shall be in a straight line in spite of side winds.

As is well known, if drift is to be avoided the craft must be headed not directly to the objective, but at some angle into the wind off the desired course. The stronger the wind the greater is the angle through which the craft must be headed off the course.

A number of automatic steering systems have been proposed for flying in a straight line towards an objective, i. e., for automatically finding the angle through which the craft should be turned off its course into the wind in order to prevent drift, but none of these have shown any realisation of the existence of a contradiction between the requirements of such a steering system and the normal requirements of an ordinary steering system, and none have shown how to resolve the contradiction or solve the enigma.

In an ordinary steering system, a direction-giving instrument is used to indicate the heading of the craft, and means are adopted to correct any departure from a heading initially set. Consequently, if the craft be suddenly subjected to turning forces, either due to gusts of wind or, e. g., to the cutting out of an engine, so that the craft begins to turn, the rudder is brought into action to prevent the turn. It is essential to an automatic steering system that this normal steering action should be brought immediately and rapidly into operation whenever there is any change of heading. The rudder must therefore be controlled by the heading, and can only be central when the craft has one particular heading.

For drift-free steering, however, the requirements are quite different, as can best be seen by considering a steady flight along the correct course with the craft headed off course by the correct amount into the wind to prevent drift: the rudder should then be central. The requirement that the rudder should be central must be capable of being satisfied no matter what is the heading, provided that this heading suits the wind so that the drift does not occur. If the wind alters, and the heading is altered simultaneously in such a manner that drift still does not occur, the rudder should remain central. In other words the rudder should be controlled only by drift, and not by the heading. This contradicts the requirement of an ordinary steering system that changes of heading should be corrected at once.

This contradiction is resolved by the present invention. We rely on the fact that the requirement of drift-free steering, viz. that the rudder should be controlled by drift alone, is a steady-state requirement, whereas the requirement for normal steering, viz. that the rudder should be controlled by the heading, is a requirement that must be satisfied immediately without interference from the drift correction system. We also rely on the fact that drift takes place relatively slowly. A craft, flying in a straight line without drift, may have its heading altered practically instantaneously through several degrees; as a result it may begin to drift or diverge from its straight line track, but this drift is very slow, and it is only after an appreciable time that sufficient divergence from the correct course will have occurred for a drift detector to indicate it with certainty. This is especially the case since drift detectors are insensitive, and therefore liable to irregular operation and irregular errors.

We take advantage of all these considerations by arranging that for short period changes the rudder is controlled in accordance with deviations from the required heading, i. e., by a direction-giving instrument, while for long period variations, i. e., for the mean over a long period, the rudder is controlled in accordance with drift.

In accordance with the invention, therefore, we provide an automatic steering system in which the rudder is controlled from a direction-giving instrument such as a magnetic compass, or a gyroscope controlled by a magnetic compass, and a correction is provided in accordance with the indications of a drift detector, this correction being applied very slowly or with a time delay so as not to affect the control of the rudder by the direction-giving instrument during a period of the order of a normal complete oscillation of heading of the craft. Preferably the heading is set on the direction-giving instrument and this heading is changed very slowly or with a time delay under the control of a drift detector. Alternatively, the rudder may be controlled differentially from a direction-giving instrument and a drift detector, the control from the drift detector being slow in action or being delayed so as to produce no appreciable effect during a period of the order of a normal complete oscillation of heading of the craft.

In order to obtain a slow-acting control from the drift detector, we may arrange that the drift detector operates a servo-motor of limited speed which changes the heading set on the direction-giving instrument through step-down gearing having a very large gear ratio. Alternatively, according to another feature of the invention, we may obtain the slow action by means of a gyroscope. In this method the drift detector applies a torque to the gyroscope causing the latter to precess slowly. The precession of the gyroscope is caused to turn the craft.

According to another feature of the invention we provide a repeat-back or negative reaction from the movement of the servo-motor, or from the precessional movement of the gyro, by which this movement operates by an amount which increases with the movement to counteract the causes producing it. For example, in the case of a drift detector comprising a wireless receiver responsive to wireless signals from the ground, the movement may be used to apply a voltage to oppose and reduce the drift-indicating output signal from the wireless receiver, the reduced signal being used to control the movement of the servo-motor or the precession of the gyro. Alternatively, in the case where the servo-motor or gyroscope is controlled by a two-part controller, one part of which is mechanically positioned by the drift indicator, the movement of the servo-motor or gyroscope may be used to move the second part of the two-part controller, or to move the first part through a differential, so as progressively to cut off the supply of power to the servo-motor or to the means precessing the gyroscope.

According to a further feature of the present invention the means for automatically changing the heading set on the direction-giving instrument are such that this change is made up of two component parts; one being made proportional to the indication of drift as by means of a negative reaction or repeat-back as already described, and the other being set by an integrating device which integrates or is controlled by the drift indication. As a result, we provide a steering system in which the path of a craft steered thereby tends asymptotically to the desired straight line course.

Many types of integrating device may be used according to our invention; a suitable one is an electric motor which is controlled in direction, or in both direction and speed, by the sense, or by the sense and magnitude, of the drift indication, the number of revolutions of said motor constituting the integral of the drift indication. The change in heading of the craft is set in accordance with the number of revolutions and the direction of revolution of the motor.

It is to be appreciated that the employment of a repeat-back if used is solely for the purpose of making the distance moved by the course-setting motor proportional to the drift angle, or, more generally, to the deviation from the course. It is therefore a means to an end, and we may employ other means. In one alternative, or modified system, we employ non-repeat back devices to produce a motion proportional to the drift indication, and use this motion, as before, to change the heading. This modification can be employed whether or not a control term is used proportional to the integral of the deviation from course.

One such modified system uses the output current from a drift indicator to excite a solenoid to cause the core to be displaced against a centralising spring in such manner that the displacement is proportional to the drift indication.

The invention will now be described more fully with reference to the accompanying drawings in which:

Figure 2 is a diagrammatic illustration of the other embodiment.

Figure 1:
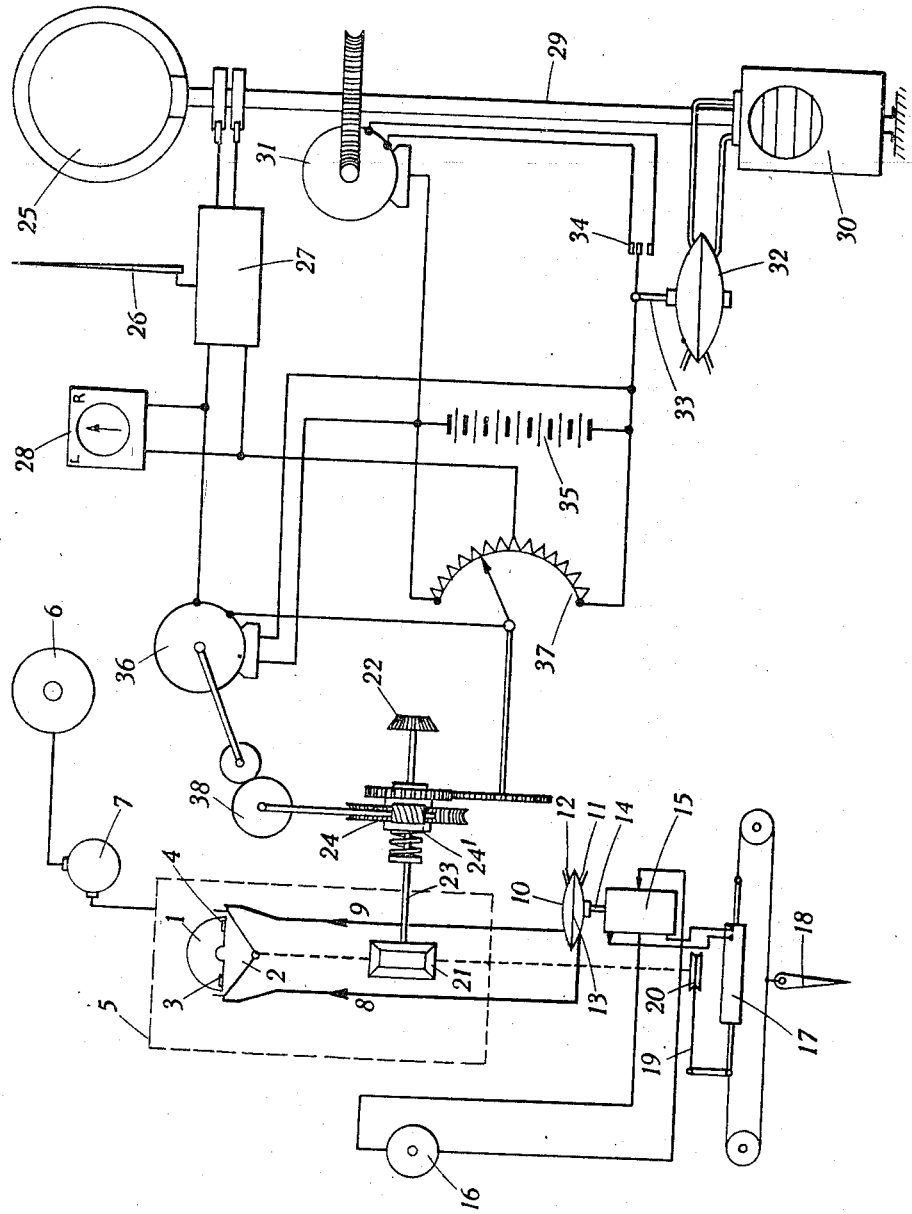
Figure 1 is a diagrammatic illustration of one of the said embodiments.

A form of the invention is shown in Figure 1 as applied to the azimuth control of a hydro-pneumatic automatic pilot of the type disclosed in the U. S. Patent to E. A. Sperry, Jr., B. G. Carlsan and M. F. Bates, #1,992,970, dated March 5, 1935. A directional instrument (not shown), such as a directional gyroscope or gyro-magnetic compass, controls the steering by means of a semi-circular cut-off plate 1 attached to it. Co-operating with the cut-off plate 1 is a follow-up member 2 mounted to turn about the same vertical axis as the cut-off plate (i. e., about the vertical axis of the directional instrument). This follow-up member is provided with air-ports 3 and 4, which are normally partly covered to equal extents by the straight edge of the semi-circular disc 1. The instrument is in a casing 5, which is continuously exhausted by the vacuum pump 6 through the reduction valve 7. The ports 3, 4 are in communication with passages leading to pipes 8, 9, which are connected to opposite sides of a diaphragm chamber 10 into which atmospheric air is admitted through constricted passages 11, 12.

The suction in chamber 5 causes air to flow through the passages 11, 12, into the diaphragm chamber 10 and thence through pipes 8, 9 to ports 3, 4. The flow through the ports 3, 4 is normally equal, so that the pressure on the two sides of the diaphragm 13 is the same and the diaphragm is central. However, on relative turning of the cut-off disc 1 and the follow-up member 2, one of the ports 3, 4, is covered to a greater extent than the other, so that the flow conditions are no longer balanced and the diaphragm 13 is moved in one direction or the other by the unbalanced pressure produced in the diaphragm chamber 10.

Attached to the diaphragm 13 is a rod 14 connected to a piston valve 15, which controls the supply of fluid from a hydraulic pump 16 to a servo-motor 17 for the rudder 18, thus causing movement of the rudder to take place in one direction or the other in accordance with the displacement of the disc 1 relative to the follow-up member 2.

In order to ensure that the rudder angle is proportional to the divergence from the desired heading, so that the rudder angle is progressively reduced as the craft returns to her heading after having been turned therefrom, a repeat-back connection is provided from the rudder to the controller 1, 2. As shown, a cable connection 19 is provided from the rudder cables to pulley 20, and pulley 20 is in driving connection through differential 21 with the follow-up member 2. By these means, when the craft has deviated from her heading, so that disc 1 is turned through an angle relative to the casing 5, the rudder is driven by servo-motor 17 only as far as is required to make the follow-up member 2 come again into alignment with the disc 1.

The heading of the craft that is maintained by the automatic steering device may be altered by knob 22, which turns shaft 23, and thereby, through differential 21, the follow-up member 2. Shaft 23 can also be turned from worm-wheel 24 loosely mounted on it, the drive being through a clutch 24'. Operation of knob 22 causes this clutch to slip, so that shaft 23 is turned while worm-wheel 24 is not turned.

When the follow-up member 2 is turned from knob 22, the servo-motor 17 operates the rudder, causing the craft to turn until the follow-up member 2 is again in alignment with cut-off plate 1. Thus the craft alternatively turns through an angle equal and opposite to that turned through by the follow-up member 1.

All the above parts are already known in combination, and together they constitute the azimuth control of a well-known type of automatic pilot. This control acts to keep the heading of the craft in a fixed angular relationship to the directional instrument to which is attached the cut-off plate 1. Initially, the pilot sets the heading by means of knob 22 and thereafter the automatic control maintains the craft flying, so that its mean heading corresponds to this heading, which, in the absence of wind, will be the same as the bearing of the destination.

If there is a wind with a side component the craft drifts, so that its ground track is at an angle to the set heading. If the pilot knows beforehand the strength of the wind he can allow for it by setting a heading different from the desired course, so that the craft is headed sufficiently into the wind to counteract the side component. The strength of the wind is liable to variation, however, and it is therefore desirable to use apparatus that will automatically alter the heading by the right amount to keep the actual direction of travel of the craft over the ground correct. It is still more desirable to keep the craft as close as possible to the ground track leading to its destination, so that, if it departs therefrom, owing, e. g., to a change in the direction or strength of the wind, its track does not merely straighten out again into a direction parallel to the desired one, but actually returns towards the desired track. To effect this result means are required responsive to departure of the craft from the straight line track, and means automatically operate therefrom to alter the heading of the craft. For brevity, we refer to departure from the straight line track as drift, even although such departure may be in the up-wind direction consequent on too large a turn of the craft from the direction of the straight line track to counteract actual drift.

In the embodiment of Figure 1, the type of drift detector employed is a wireless direction-finder comprising a direction-finding loop 25 and a vertical antenna 26, both of which feed a receiver 27 of the kind well known in the art for operating a right-left indicator, such as that shown at 28 for indicating to which side of the wireless transmitter the loop 25 is directed. The shaft 29 of loop 25 is rigidly connected to the casing 30 of a direction-giving instrument, such as a directional gyro or gyro-magnetic compass; a servo-motor drives both loop 25 and casing 30 to follow-up the direction-giving instrument. For this purpose, a pick-off or controller similar to the controller 1, 2, is provided, operating a diaphragm 32 in the same manner as diaphragm 10 is operated. To the diaphragm is attached a rod 33, which operates contacts 34 controlling the supply of current from battery 35 to run the motor 31 in the appropriate direction.

The loop 25 is therefore stabilised in direction in azimuth, irrespective of yawing of the craft, so that the deflections of the instrument 28 correspond to changes in the absolute direction or direction relative to the ground of the transmitting station from the craft, due to drift of the craft from the straight ground track. The indications of the instrument 28 may therefore be considered to be drift indications.

The receiver 27 will naturally be provided with automatic gain control arrangements for ensuring that the indications of the instrument 28 corresponding to particular angles between the loop 25 and the direction of arrival of the wireless waves, irrespective, within limits, of the strength of the signals. Such arrangements are well known. Preferably, the automatic gain control should be of high efficiency for the purpose of our control system.

In parallel with the output 28 of receiver 27, another circuit is provided containing a winding of the electric servo-motor 36, and the part of a potentiometer 37 included between the contact arm and the centre part of the potentiometer winding. Thus the motor 36 is controlled by the output of the receiver 27 combined with the repeat-back voltage from potentiometer 37. For this purpose, another winding of motor 36 and also the potentiometer 37 are continuously supplied from the battery 35.

As shown, the servo-motor 36 drives through high ratio reduction gearing 38 the worm-wheel 24, which turns the shaft 23 through a slip-friction clutch and thereby alters the heading set on the direction controlling instrument in the form of the position of the follow-up member 2. The motor 36 also drives, through the gearing 33 and 24, the contact arm of potentiometer 37 and thereby introduces a repeat-back voltage opposing that provided by the receiver 27, so that the motor 36 stops when it has turned through a number of revolutions proportional to the voltage output of the receiver.

In this way, the change of heading effected is proportional to the drift angle measured by the direction-finder as indicated by instrument 28. The change of heading must be larger, preferably several times larger—e. g., 10 or 20 times—than the drift angle, and it must be such as to turn the craft to the left if the bearing of the wireless station is to the left of the zero signal direction of the loop.

The reduction ratio of the gearing 38 should be such that the change of heading due to the motion of the shaft 23 should be very slow, so that no appreciable change is made during a normal period of oscillation of the craft—whether in yaw, pitch or roll. Preferably, the heading should be altered at a rate as slow as 1° or 2° per minute or even slower.

It is difficult to obtain a wireless direction-finder, such as that described in the system of Figure 1, that indicates the direction of the transmitting station with certainty and with an accuracy greater than 1°. When the transmitting station is at a distance of only 60 miles from the craft, this accuracy corresponds to a deviation from the straight line track of approximately 1 mile, and, at greater distances, the corresponding deviation is proportionally greater. Thus, it is readily understood that, with this type of drift detector, deviations from the straight line track of the order of miles may be experienced before they are indicated with certainty. Nevertheless, it has been proposed in previous drift-preventing steering systems to reduce the sensitivity and accuracy of a drift detector of this kind in order to avoid unwanted effects.

Owing to the improvements provided by the use of a slow-acting correction system and by the use of a repeat-back to the drift detector from the heading-changing means, we are enabled to use the utmost sensitivity and accuracy obtainable in wireless direction-finders, and so far from wishing to cut down the accuracy, we find it advantageous to use the most accurate direction-finding equipment obtainable.

The invention may also be carried out employing other varieties of drift detectors. In the case of a craft intended to fly along a wireless beam of the split beam type, in which one indication is given when the craft is to one side of the beam and another when the craft is to the other side of the beam, it is common to provide a visual indicator of the position of the craft relative to the beam. A receiver responsive to such a beam may replace the azimuth stabilised direction-finding loop and receiver.

Figure 2 shows a system using only a single direction-giving instrument, the direction-finding loop 25' being stabilised in azimuth from this instrument and the steering also being controlled from it.

The instrument is provided with a cut-off plate 1' co-operating with air-ports 3', 4' on a follow-up member 2' for controlling a diaphragm 13'. This diaphragm, however, is arranged to operate contacts 40 and thereby the electric servo-motor. The motor 41 drives the worm-wheel 24'' through reduction gearing 38', and it also drives the direction-finding loop 25' by the flexible shaft 42 and reduction gearing 43. Worm-wheel 24'' engages by means of friction clutch 24''' with shaft 23', which is connected to turn the follow-up member 2'. The gear ratios are so arranged that the loop 25' turns through the same angle as the member 2', so that the loop is stabilised in azimuth against turning or yawing of the craft.

A course-setting knob 44 is provided; this must be pushed in to engage a member (not shown) for turning shaft 23', in which process clutch 24''' slips. When the knob is pushed in, a switch (not shown) is operated to open the supply circuit to motor 41. When the knob 44 is released, the motor is energised again and runs to restore the displaced follow-up member 2', thereby also turning the loop 25. An indicator 45 driven from the worm-wheel 24'' through gearing 46 is provided in cases where the direction-finding loop 25' is remotely situated, thereby providing an indication of the angular position of the loop.

Shaft 23' drives through gearing a cut-off plate 101 cooperating with a follow-up member 102. The cut-off plate 101 may be regarded as a repeater compass repeating the movements of cut-off plate 1 and the steering may therefore be controlled from this in the same manner as it is controlled from the directional instrument in Figure 1. Corresponding parts in the control of the rudder are therefore marked in Figure 2 with reference numerals as in Figure 1 increased by 100.

The repeat back movement from the rudder is through cable 119, pulley 120 and differential 121.

The third shaft 123 of the differential is rotatable by knob 122 for initially aligning the follow-up member 102 with the plate 101 or for changing course. The shaft 123 can also be driven by the gear 124 through the friction clutch 124'. In this way the drift control adjustment is introduced as in Figure 1, the output of amplifier 27' together with the repeat back voltage from potentiometer 37' controlling motor 36' to drive the gear 124.

In Figure 2 we also show another feature not present in the system of Figure 1, which is the use of a correction to the heading effected by the drift detector composed of two terms, one proportional to the drift indication and the other to the time integral of this indication. Motor 36' provides the drift term since it is controlled from the drift indication—the output of amplifier 27'—with a repeat back from potentiometer 37', while motor 47 provides the integral-of-drift term. For this purpose motor 47 is controlled from the output of amplifier 27' without any repeat back; it therefore runs continuously as long as there is any such output; its speed also varies with the magnitude of the output so that the angular rotation of its shaft may be considered as an approximate measure of the integral of the drift indication.

The motors 36', 47 each drives, through high ratio reduction gearing, 48, 49, one shaft of differential 50, the output shaft 51 of which drives the gear 124 to apply the correction to the heading.

Instead of an electric motor any other suitable form of drift-integrating motor may be used, e, g., a fluid turbine motor such as a reversible air-turbine controlled by a deflecting vane co-operating with an air jet and positioned by a solenoid supplied from the output of the amplifier 27'. In such an arrangement the said vane is normally central so that the air impinges from the jet radially onto the turbine blades, which are radially set, but when the solenoid is excited the deflecting vane is moved thereby, so that the jet of air drives the turbine in a direction depending on the sense of the displacement of the vane.

One of the advantages of using an integral-of-drift correction term is that the correction applied by it does not disappear if the wireless signals should fail, so that the craft keeps the corrected heading instead of turning back to the heading set on the direction-giving instrument. The integral term, as it were, provides the system with a memory. However, if this term were used alone the craft would hunt from side to side about its straight line track. The use of the combination of a drift term and an integral of drift term has therefore distinct advantages.

It will be seen also that the use of an electric servo-motor (36 or 36') directly controlled from the output of the direction-finding receiver (27 or 27') provides advantages, as it enables us to use a particularly simple method of obtaining a repeat-back by purely electric circuit methods (the use of potentiometer 37 and 37'). This feature also facilitates a modification of the system of Figure 1, which will now be described.

In theory it is possible to use the system of Figures 1 and 2 without stabilising the direction-finding loop in azimuth. The direction-finder then measures not the true drift angle D (i. e., the change in the absolute bearing of the transmitting station from the craft due to drift of the craft from the straight-line course), nor the heading H of the craft, but the difference D—H, whereas, if the loop is stabilised, it measures D. It is evident that we can use a non-stabilised loop (measuring D—H) and add to the measurement a measurement of H derived from a pick-off on the direction-giving instrument: by doing so, we obtain a measurement of D as useful as one derived from a direction-finder employing a loop stabilised in azimuth.

In the system of Figure 2, the rotation of the follow-up member 2' and shaft 23' is a measure of H (the change of heading), and it could be used for the purpose just described, but the follow-up motor 41 that drives member 2' is only present for the purpose of stabilising the loop 25' in azimuth, and if the loop is not stabilised it would not be present. In the system of Figure 1, the position of the follow-up member 2 is not, strictly speaking, a measure of the change of heading H, owing to the fact that the follow-up is of a coarse and slow character since it depends on the operation of the rudder servo-motor 17. However, this is of little importance for the purpose of controlling motor 36' since the correction set by this motor is much slower still. Accordingly, therefore, in the system of Figure 1, we can employ a direction-finding loop not stabilised in azimuth by controlling another potentiometer similar to 37 from the movement i. e. of the follow-up member 2' and inserting its output in series with that of potentiometer 37 and with that of amplifier 27 to control motor 36.

In theory, even this correction might be dispensed with, and the system of Figure 1 might be used with a non-stabilised loop uncorrected by a measurement of the change in heading. Such a system is theoretically possible if the motor 36 is very slow-acting in accordance with the principles of our invention, provided that the heading is altered by it in the direction to increase the received signal, and that the gear ratios are so chosen that the alteration of heading effected is greater, but only slightly greater, than the angle measured by the direction-finder (the angle between the direction-finder and the normal to the loop). However, the whole system is then nearly in an unstable condition and we prefer not to use this variation.

Another variation is to provide the DF loop with a follow-up system to keep it directed not in a fixed direction relative to a compass (i. e., relative to the ground), as in Figures 1 and 2, but to the transmitting station. The follow-up motor is then, of course, controlled directly from the output of receiver 27 or 27', and it runs to make the output of this receiver zero. The angular rotation of this motor on the craft is H—D, and this rotation can be used as a measure of this quantity instead of using the output of a non-stabilised loop, as in the last two variations described. In particular, the rotation of this motor could turn one potentiometer to provide a voltage to replace the voltage output of the receiver 27 in Figure 1 to control the motor 36. A repeat-back voltage from potentiometer 37 may be used as in Figure 1, as may also a voltage from an additional potentiometer operated by the follow-up member 2, this last being for the purpose, as before, of correcting the control of motor 36, so that this is controlled by D instead of by D—H.

In the last variation, the movement effected by motor 36 must be very slow in accordance with the principles of the invention, but the movement of the DF loop towards the transmitting station need not be. An alternative is to make this last mentioned movement itself slow by employing high ratio reduction gearing between the loop and the servo-motor that orients it. This movement may then be directly imparted, as a correction to the heading, by rotating the follow-up or pick-off member of the directional instrument controlling the steering.

In the systems that have been described up to now in this specification, the correction value has been obtained by a number of alternative methods, but its application has in all cases been rendered slow by employing a motor to effect the alteration in heading through high-ratio reduction gearing. Another variation is to obtain the correction value, as in any of the preceding methods, but to apply it to precess the gyroscope controlling the steering, the torque applied to the gyroscope being small. For example, if the direction-giving instrument controlling the steering is a gyroscope controlled by a magnetic compass, such as that shown in U. S. Patent #2,092,032 to E. A. Sperry, Jr., and H. H. Thompson, dated September 7, 1937, the correction value may be applied by a motor to rotate the bowl or casing of the magnetic compass. Thereafter, the gyroscope slowly precesses to take up the same position relative to its casing as the magnetic compass has relative to its casing. Alternatively, again, the gyroscope may be made to precess by means of a torque directly applied to it. Thus the output of receiver 27, which is the correction value to be used, may be passed through a solenoid, instead of motor 36, to apply a torque to the gyroscope of Patent #2,092,032, so as to precess this and cause the cut-off plate 1 of Figure 1 to rotate. Since the gyroscope is controlled to keep alignment with the magnetic compass, the precession will cease at an angle from the normal position corresponding to the correcting torque applied.

In altering the mean heading through an angle proportional to the angle of drift, the factor of proportionality is preferably high and may be of the order of 20 to 1. This introduces a difficulty, for it is possible that a craft might drift sufficiently to reach a drift angle of more than about 4° or 5°, if, for example the wireless direction-finder had temporarily been unable to receive from the transmitter. In such a case the heading might thereafter automatically be altered by the control system through more than 90°, which is undesirable. We may therefore arrange that for drift indications, or for drift angle indications, of more than a predetermined amount, say more than a few degrees, the factor of proportionality diminishes. For example, the drift indicator itself may be limited, so that it cannot indicate more than say 3° or 4°. Alternatively, auxiliary controls may be brought into operation when the heading exceeds a given angle, say 75°, so as to override any control from the drift indicator, and to operate on the rudder or course-setting device to prevent further change of heading.

In the case where a gyroscope as distinct from a gyro magnetic compass combination controls the steering, if torque is applied to the gyroscope by means of a drift detector the correction is proportional to the integral of drift instead of being proportional to drift. If, therefore, a correction proportional to drift is required it is necessary to employ a repeat-back to cut off the torque as the gyro precesses.

As many changes could be made in the above described systems and many apparently widely different embodiments of this invention could be made without departing from the scope thereof, it is intended that all matter contained in the above description or shown in the accompanying drawings shall be interpreted as illustrative and not in a limiting sense.

What we claim is:

1. An automatic steering system for aircraft in which the rudder control is composed of control from a direction-giving instrument and additional control from the indications of a drift detector in such a manner as to correct the heading of the craft when drift is detected so as to reduce such deviation, this correction of heading being provided by a drift detector comprising a wireless direction finding receiver including a loop rotatably mounted on the craft and fixed in azimuth at an angle initially set according to the heading required, and means for combining with its own indication an indication of the change of heading of the craft furnished by a direction-giving instrument.

2. A drift-free steering device as claimed in claim 1 in which the drift detector is a wireless direction finding receiver including a loop maintained in the direction of the transmitting station by means of a follow-up system controlled from the output of the receiver, the rotation of the loop being used as the drift indication in accordance with which the heading of the craft is corrected.

3. In a system for preventing drifting of an automatic pilot controlled craft from the straight ground track toward a radio transmitting station, a radio direction finder loop for receiving signals from said station, means for initially setting said loop on said station, means for stabilizing said loop in azimuth in said set position, a servo motor controlled by signals from said loop to cause change in the course of the craft through said automatic pilot, said servo motor and its connections to said automatic pilot being so constructed and arranged that the correction of the heading set in thereby is so slow as to produce no appreciable effect on the ordinary control from the automatic pilot during the normal yawing period of the craft.

4. A drift-free automatic steering device as claimed in claim 3, having a follow-up device in the control of said servo motor whereby the course change angle set in thereby is proportional to the amplitude of the signal from said loop.

5. In a system for preventing drifting of an automatic pilot controlled craft from the straight ground track toward a radio transmitting station, a radio direction finder loop for receiving signals from said station, means for setting said loop on said station, dual motive means for changing the course of the craft through said automatic pilot, the speed of rotation of one of which is responsive to the magnitude of the signal received from said loop and the speed of the other is responsive to said signal magnitude modified by a follow-back control, whereby the course change effected is responsive both to the angle of side drift and an integral of said angle.

6. A drift-free steering device as claimed in claim 5, in which the integrating device is a motor controlled in both direction and speed by the sense and magnitude of the drift indications.

7. A drift-free steering device as claimed in claim 5, wherein the follow-back control comprises a potentiometer actuated from the second mentioned motor and connected to oppose the signal from the loop.

WILLIAM GEORGE HARDING.
ROBERT HAYES NISBET.